United States Patent [19]

Crouch

[11] Patent Number: 5,202,964
[45] Date of Patent: Apr. 13, 1993

[54] INTERFACE CONTROLLER INCLUDING MESSAGING SCANNER ACCESSING STATE ACTION TABLE

[75] Inventor: Richard W. Crouch, Gustine, Calif.

[73] Assignee: Rolm Systems, Santa Clara, Calif.

[21] Appl. No.: 604,557

[22] Filed: Oct. 26, 1990

[51] Int. Cl.$^5$ .......................................... G06F 13/10
[52] U.S. Cl. ................................... 395/275; 395/325;
364/222.2; 364/284.2; 364/238.3; 364/264;
364/264.6; 364/DIG. 1
[58] Field of Search ............... 364/DIG. 1 MS File,
364/DIG. 2 MS File, 130, 141; 395/275, 325,
725, 425; 340/825.06, 825.57; 370/85.2

[56] References Cited

U.S. PATENT DOCUMENTS

| | | | |
|---|---|---|---|
| 3,673,577 | 6/1972 | Edstrom et al. | 395/575 |
| 3,906,163 | 9/1975 | Brenski et al. | 371/15.1 |
| 3,922,644 | 11/1975 | Borbas et al. | 364/200 |
| 4,122,519 | 10/1978 | Bielanski et al. | 395/600 |
| 4,162,520 | 7/1979 | Cook et al. | 395/275 |
| 4,200,929 | 4/1980 | Davidjuk et al. | 364/200 |
| 4,325,119 | 4/1982 | Grandmaison et al. | 395/375 |
| 4,400,773 | 8/1983 | Brown et al. | 395/275 |
| 4,413,319 | 11/1983 | Schultz et al. | 395/275 |
| 4,430,724 | 2/1984 | Hamilton et al. | 395/425 |
| 4,791,553 | 12/1988 | Campanini | 364/200 |
| 4,965,721 | 10/1990 | Holtey et al. | 364/200 |
| 4,972,365 | 11/1990 | Dodds et al. | 395/275 |
| 5,038,275 | 8/1991 | Dujari | 395/275 |

OTHER PUBLICATIONS

"Attached Processor", IBM TDB, vol. 23, No. 10, Mar. 1981, pp. 4481–4483 by E. G. Drimak et al.

Primary Examiner—Michael R. Fleming
Assistant Examiner—Gopal C. Ray

[57] ABSTRACT

A state driven system includes a plurality of sub-programs and microcodes in storage. A plurality of peripheral units and an entity are connected to a common bus. Changes in state of the peripheral units are detected in a scanning mode, and in response to such state changes a state action table containing action commands is accessed for retrieving necessary action commands to drive a state processing table for assembling a combination of program addresses and microcodes. Programs associated with the addresses are retrieved from memory and executed, and logic cards are operated by given ones of the microcodes for operating the peripheral units in their changed states.

12 Claims, 8 Drawing Sheets

INTERFACE CONTROLLER INCLUDING MESSAGING SCANNER ACCESSING STATE ACTION TABLE

FIELD OF THE INVENTION

The field of the invention relates generally to state driven software systems, and more particularly to such systems as used in conjunction with telephone networks.

BACKGROUND OF THE INVENTION

State driven software systems are often used to interface an external entity (hardware or software) to a software system. The external entity communicates information to the software system by reporting its state. The software system maintains its own last known state for the entity. When a new state is received the current and new states are compared. If they are different it indicates that the entity changed states. This state change or transition causes the software system to take a specific action.

These systems are typically implemented using a state action table. This is a two dimensional array. It is indexed by the software current state and the new state read from the entity. The result is a value that causes an action routine to be performed for that specific state transition. The number and complexity of the actions is a function of the number of states possible in the entity. An example of a system using this approach is the Sigma Tie Trunk Interface (TTI) manufactured by Rolm Systems, Inc., Santa Clara, Calif. In the TTI software only one large action routine was provided. It contained a CASE (statement in "C" programming language) statement that decodes the action to be performed based on the input from the state action table.

In some systems the states supported by the entity are not fully connected. For example, an entity in state X may legally change to state Y and Z but not to states A and B. This presents special problems for the software system. Various events (software restarts, communications errors or software/hardware faults) may cause entity state reports to be lost or corrupted. In this case the software system may be presented with a state transition that is not legal for that entity. In the TTI system illegal state transitions are ignored until a legal transition occurred.

When the software system is initialized some special processing is needed to insure that the software current state for the entity matches its actual state. This is typically done by setting the software current state to a pseudo state of RESTART/INITIALIZATION. The system then forces the entity to transmit its current state. A special state action table is provided to process this initial state transition. The TTI scanner uses a separate state action table on the first execution following a system restart or initialization.

Systems such as the TTI, and other such state driven software systems, may find use in many different applications where a central processing unit, for example, must interface with a plurality of peripherals, such as input/output devices that may be either local and/or remote to the central processing unit. One application is associated with telephone networks such as a PBX (Private Branch Exchange), and/or a CBX (Computerized Business Exchange). A CBX is a switching device typically used in a medium sized business for controlling the telephone system internal to the business. A CBX device provides the facility for answering a plurality of phones, interconnecting the associated phones to incoming calls or to selected ones of the internal phones in the exchange, signalling various ones of the phones in the system, and monitoring usage of the associated telephones. A modern CBX typically includes a computer connected to a bus servicing a plurality of telephones, for sending data signals between the computer and the various telephones in accordance with some programmed format. In this example, the telephones are considered peripheral devices for the particular computer and associated software system. A CBX is an interrupt driven system, whereby upon receipt of a signal, typically an incoming telephone call, software driven hardware senses an incoming call, and sets an interrupt flag which is driven onto the bus, for typically alerting a particular peripheral (telephone set in this example) that there is a call to pick up. Sophisticated ones of such systems may be programmed for leaving a message on a particular telephone peripheral device that a call was received at a particular time from a certain individual or number, and was unanswered. If the call is answered, the CBX acts to interconnect the calling signal with the appropriate peripheral telephone. As would be known to one of skill in the art, there are many other functions that may be provided in a computerized business exchange for use with telephones, or other such peripheral devices.

In known computerized business exchanges or CBX's, the system responds to an incoming signal such as a telephone call, by determining the software required for enabling a particular card or logic network associated with the desired peripheral system, for insuring that a particular action is carried out. The CBX monitors the particular card or logic network for a feedback signal or indication that the card has responded. In such prior systems, if a fault occurs causing the system to become hung up through cyclic repetition of a particular function that for some reason cannot be completed, prior systems may require an extraordinary amount of time to recover from such a fault mode, or may even cause the entire system to crash. In the event of such faults or crashes, an entire system, such as a telephone system, may become completely inoperative.

SUMMARY OF THE INVENTION

An object of the present invention is to provide an improved state driven software system establishing an interface between an external entity with a plurality of peripheral units, each of which may have a large number of possible states.

Another object of the invention is to provide an improved state driven software system capable of automatically recovering from illegal state transitions.

Yet another object of the invention is to provide a state driven software system requiring no special initialization sequences for executing various routines, or for recovering from a communications failure with the external entity.

Yet another object of the invention is to provide a state driven software system that is easily modified in a field environment.

With the problems of the prior art in mind, the present invention includes a state driven system including data tables which are referred to in response to incoming signals for establishing appropriate software for use by the system in general, and/or peripheral devices serviced by the system. A state messaging scanner means is programmed for executing a primary scan phase for reading scan flag registers associated with a plurality of state messaging cards. After the read cycle, the values of the scan flag registers are processed for determining channels that have changed state relative to an immediately preceding a primary scan cycle, whereby such channels are then scanned in a secondary scan phase cycle. In the secondary scan phase, the state messaging scanner means is programmed for determining the validity of the state change information associated with respective channels. If a state change for a particular channel is determined valid, the state messaging scanner means is programmed for indexing into a state action table for determining appropriate action to be taken. Thereafter, the scanner means enters into an output phase or cycle for assembling the commands for transmission to various cards in a command buffer necessary for properly communicating with and operating the peripheral or I/0 devices in their new states; and to controller means responsive to certain of the commands for executing given ones of a plurality of program routines necessary for the new states of said peripheral devices.

BRIEF DESCRIPTION OF THE DRAWINGS

Various embodiments of the present invention are described below with reference to the drawings, in which like items are indicated by the same reference designation, wherein.

DETAILED DESCRIPTION OF THE INVENTION

Figure 1:
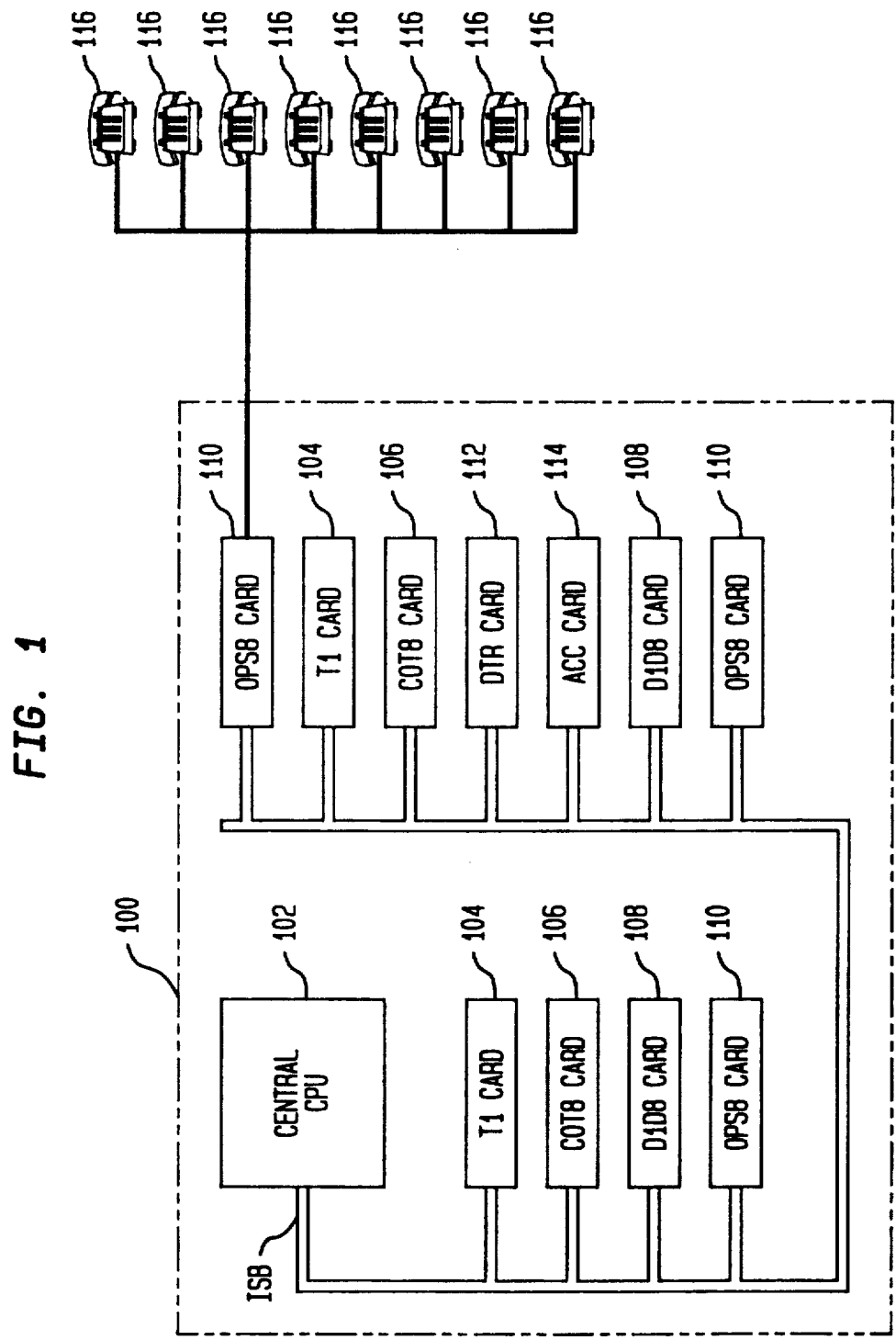
FIG. 1 is a simplified block/schematic diagram of a typical system in which the present invention may be used.

The present invention has relatively broad application for improving the efficiency and reliability of computerized systems including a central processing unit for controlling the interconnection of a plurality of peripheral devices to a common bus, and the interconnection of the peripheral devices both to one another and to outside signal sources. Although not meant to be limiting, the present invention is illustrated herein for use in a telephone network such as a PBX (Private Branch Exchange) and/or CBX (Computerized Business Exchange). A typical CBX System 100 is shown in FIG. 1.

The CBX 100 includes a central processing unit 102, a T1 card 104, a COT8 Card 106, a DID8 Card 108, an OPS8 Card 110, wherein a plurality of such state messaging cards may be used in the system, as illustrated. Further included are a DTR Card 112, and an ACC Card 114. The system shown in FIG. 1 is a portion of a CBX 9751 system, manufactured by Rolm Systems, Inc., a Siemens Company, Santa Clara, Calif. Each OPS8 Card 110 provides eight channels for connection to off premises telephones 116, as shown. Each of the COT8 cards 106 provides eight channels for central office trunks. Each DID8 Card 108 provides eight channels for direct inward dialing trunks. Each T1 Card 104 provides 24 channels of T1 trunks. The ACC Card 114 provides the necessary interface for attendant operators consoles. The DTR Card 112 provides eight channels of DTMF (dual tone multifrequency) registers.

The illustrated CBX System ISB (inner shelf bus) tme division multiplexed bus. Typically the CBX System 100 can contain up to 400 state messaging cards, such as the illustrated cards 104, 106, 108, 110, 112, and 114. As indicated, the cards may have from eight to twenty-four channels depending upon the type of card.

The CBX System 100 is designed for continuous operating while performing on-line maintenance. As a result, the aforesaid cards, and other devices connected to the ISB bus are removed and installed while the System 100 is operating. In typical systems, maintenance operations or component failure can cause interruptions in communications along the ISB bus. As will be described below, the present invention provides the System 100 with the capability of isolating a failure to a given component, for permitting the component to be either replaced or isolated from properly functioning devices for permitting the System 100 to maintain or immediately return to service.

Figure 2:
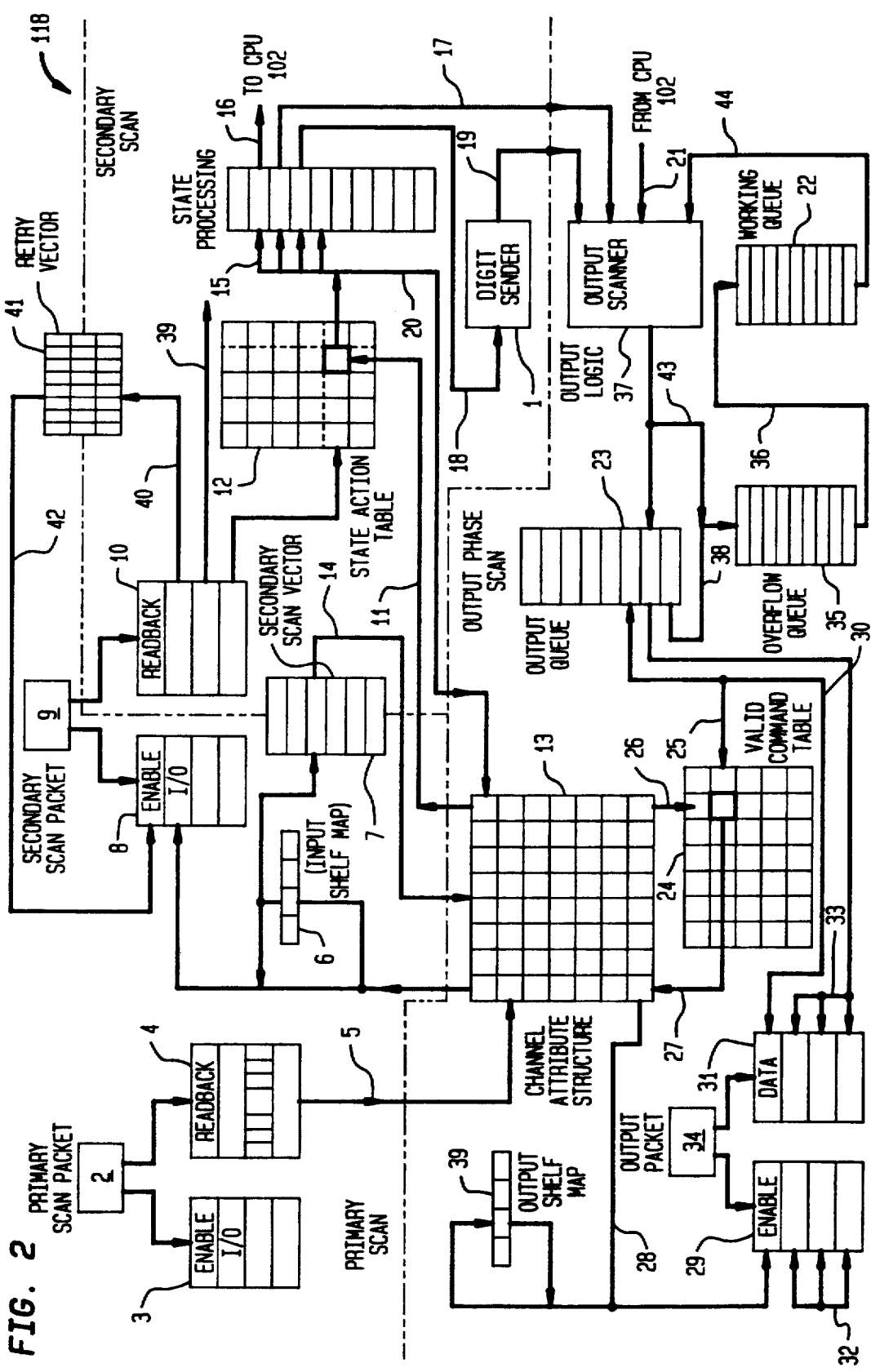
FIG. 2 is a block/schematic diagram of a state messaging scanner of one embodiment of the invention.

The CPU (Central Processing Unit) 102 includes a state messaging scanner 118, illustrated in FIG. 2. In FIG. 2, the data flow for the state messaging scanner 118 is illustrated, and will be described below.

Figure 3:
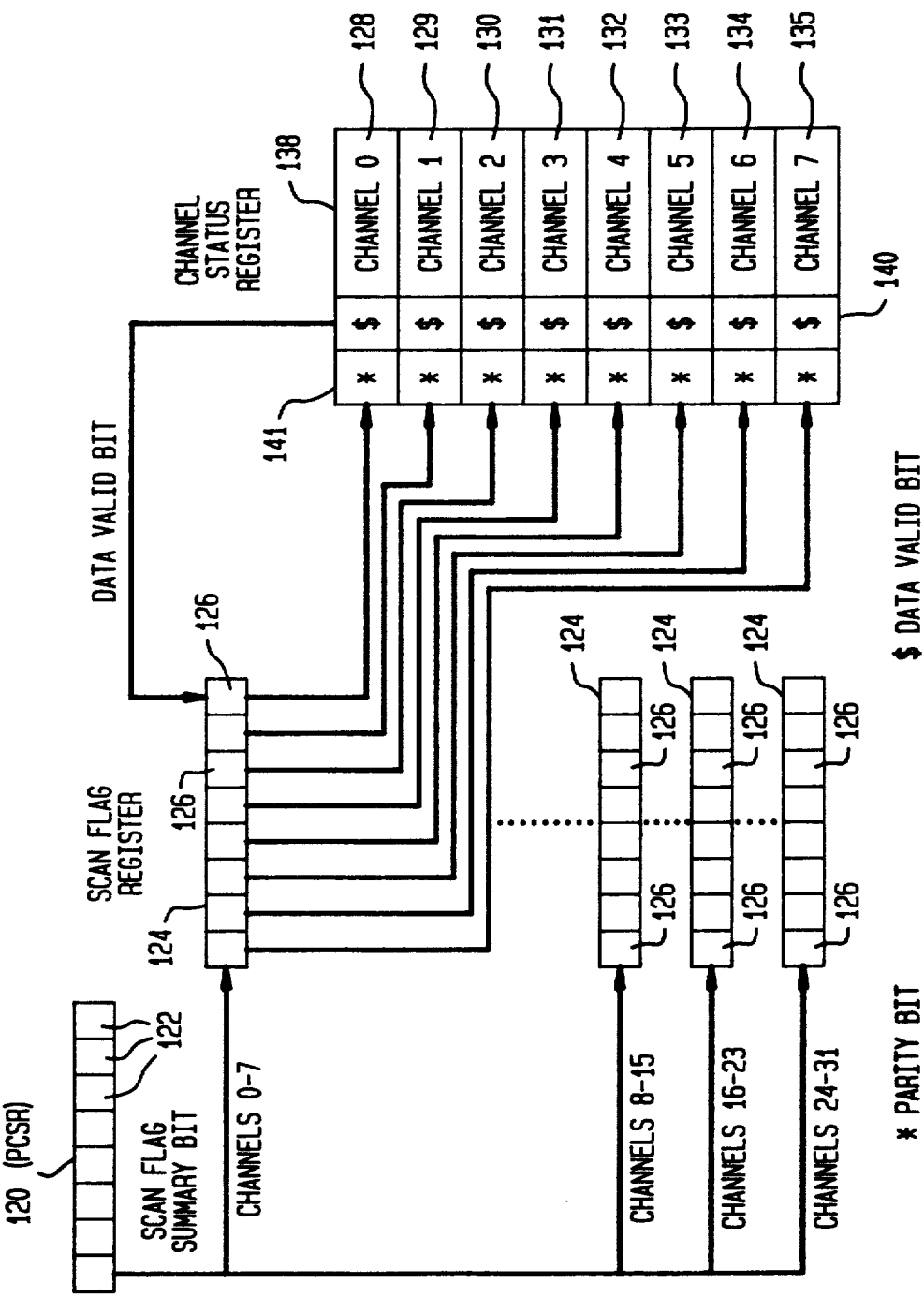
FIG. 3 is a simplified block/schematic diagram showing status registers for a state messaging card of one embodiment of the invention.

All of the previously mentioned state messaging cards 104, 106, 108, 110, 112, and 114, respectively, present a common hardware interface to the scanner 118. This interface contains card and channel level status, and command and data registers. In FIG. 3, the normal status registers for a state messaging card are shown. The format and relationship of the card and channel level status registers will now be described.

The main card status is kept in the primary card status register (PCSR) 120. This register contains information about overall card status and a status bit that is of interest to the scanner. This bit is called the scan flag summary bit 122. It is set when any of the scan flag registers 124 on the card has a bit set.

The scan flag registers 124 are a series of registers containing one bit 126 per channel. If a bit 126 is set in the scan flag register 124, it indicates that the associated channel (one of 128 through 135 for channels 0 through 7, respectively, in this example) has a new status to report to software. The status is reported in the channel status register 138. The channel status register contains data valid bits 140 shown as "$" for each channel 128-135, respectively. These bits 140 are each set when a new value is written into the register 138 by firmware for an associated channel 128-135, and reset when the register 138 is read by software. When a data valid bit 140 is reset, the associated scan flag register bit 126 is also reset.

Note also in FIG. 3 that the channel status register 138 also includes in association with each channel parity bits 141, respectively, shown as an asterisk ("*").

Figure 4:
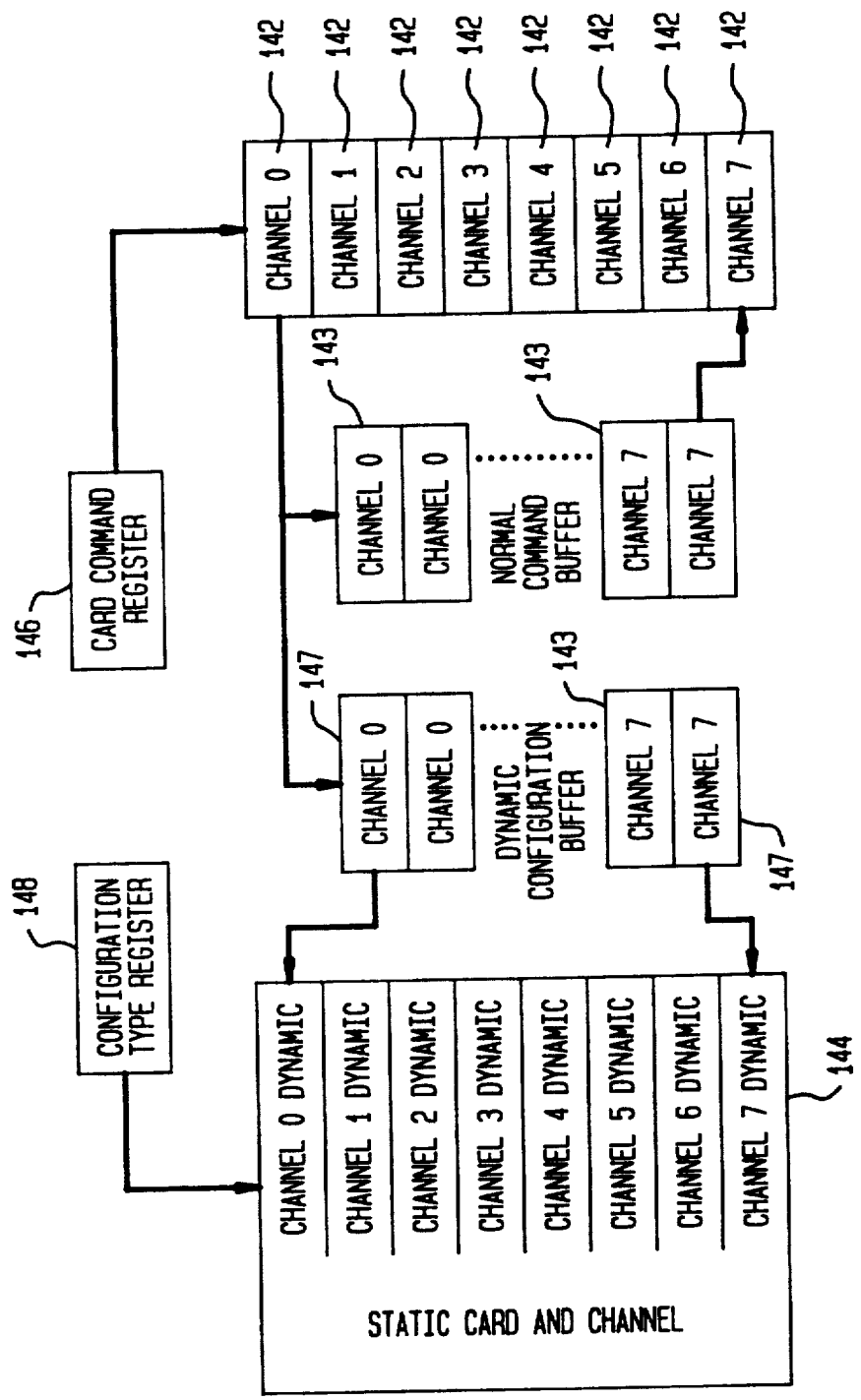
FIG. 4 is a block/schematic diagram showing card command and data registers of a state messaging card of one embodiment of the invention.

FIG. 4 illustrates the format of the card and channel level command registers 142 and data registers 144. Each channel on the card has a separate command register 142. The firmware buffers commands sent to these registers 142 are such that two dynamic configuration commands and two normal commands can be buffered at one time, via dynamic configuration buffers.

Each state messaging card 104, 106, 108, 110, 112, and 114 has a common card command register 146. Card commands are written to this register. Card commands are executed as they are received.

Each state messaging card 104, 106, 108, 110, 112, and 114 has card command data register and configuration type registers 148. Static card and channel configuration commands are written to the configuration type register 148 or the channel command register 142. Static configuration commands take data from the entire configuration data register 148. Dynamic configuration commands are written to the channel command register 142. These commands take two bytes of data from the portion of the configuration data register 148 associated with the channel. Because commands are written to different registers, the configuration data register 148 control must be exercised to insure that the data is not overwritten.

Figure 5:
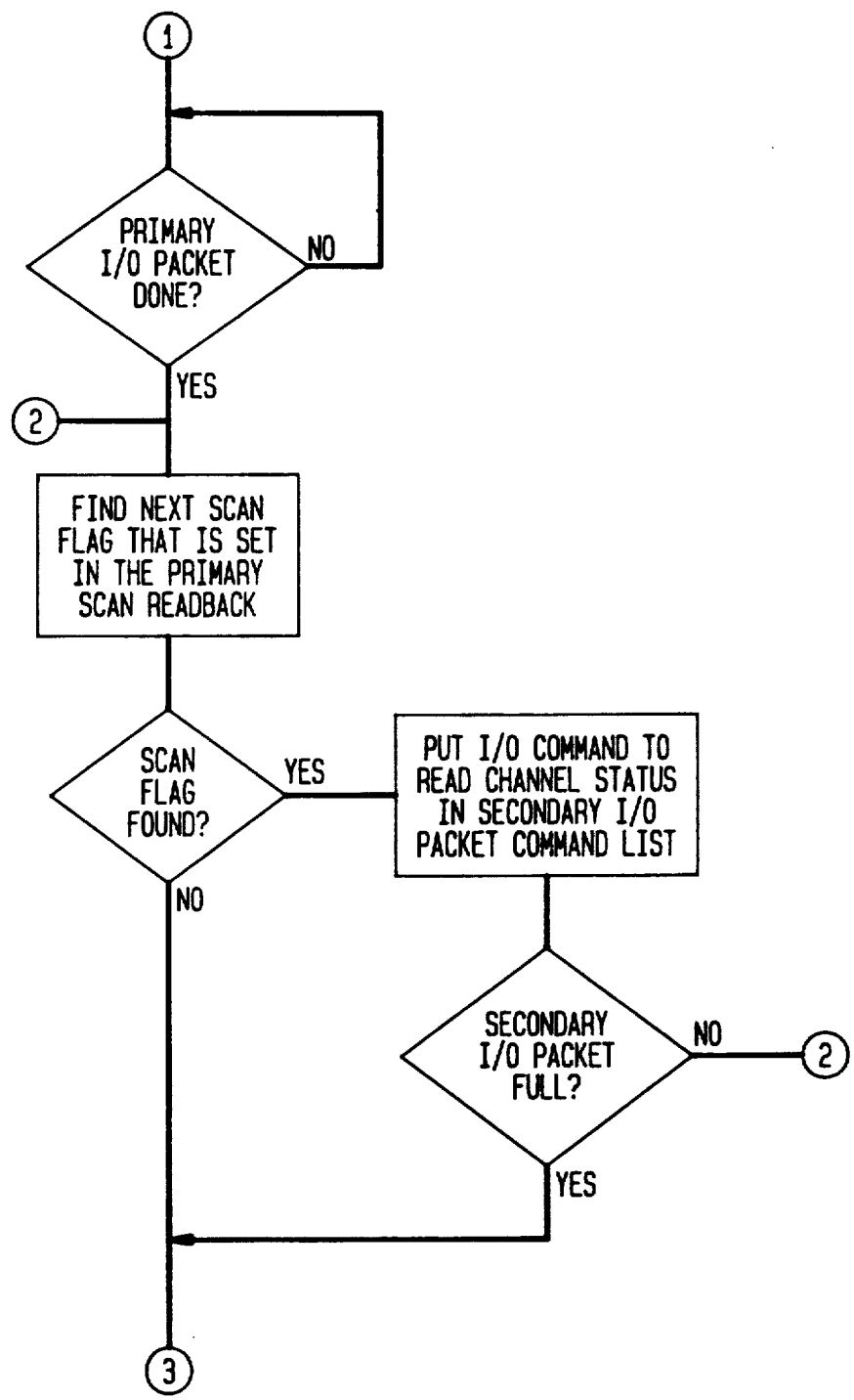
FIG. 5 is a flow diagram showing a "primary scan phase" of one embodiment of the invention, relative to the scanner of FIG. 2.
Figure 6:
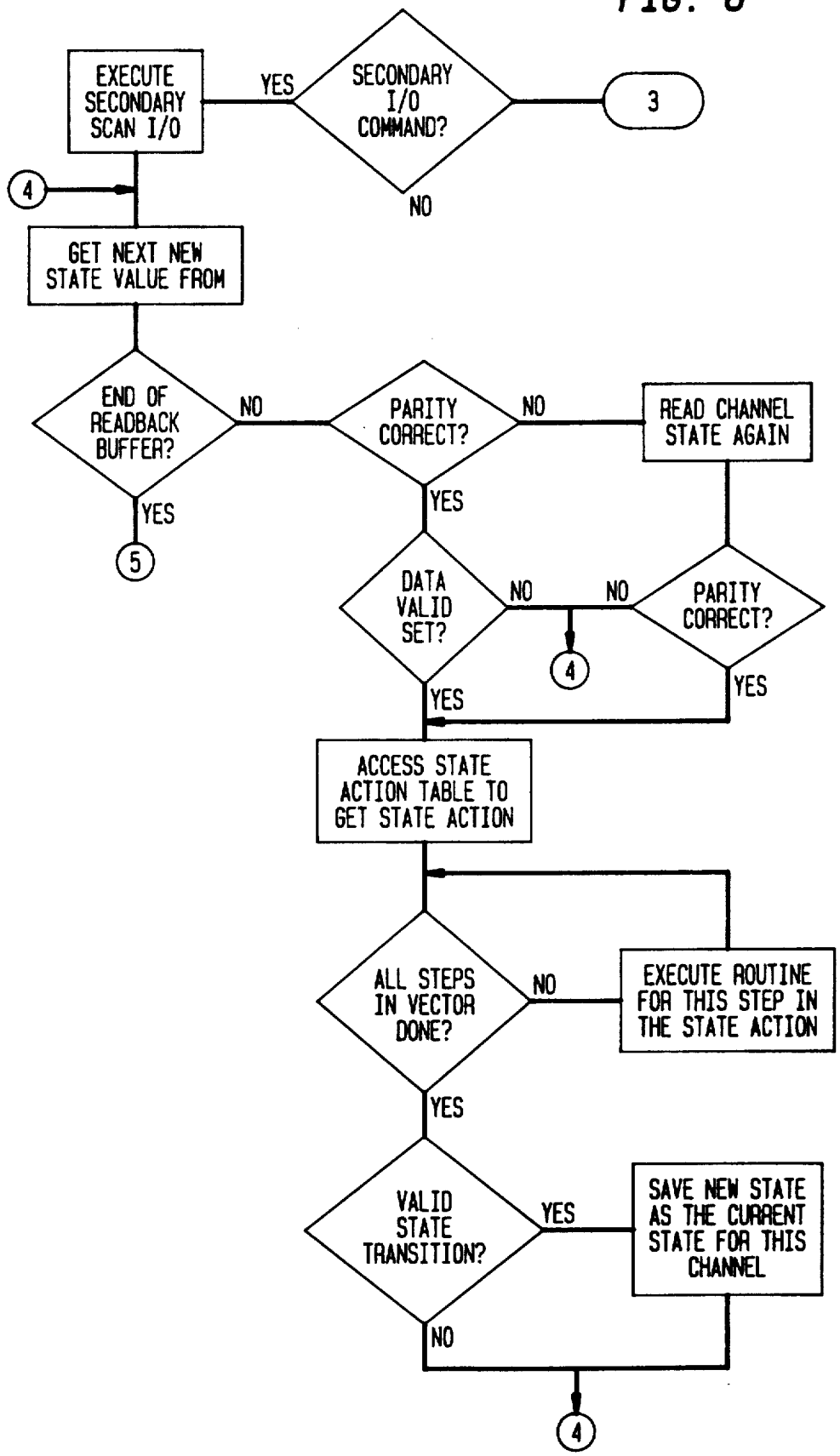
FIG. 6 is a flow diagram showing a "secondary scan phase" of one embodiment of the invention relative to the scanner of FIG. 2.
Figure 7:
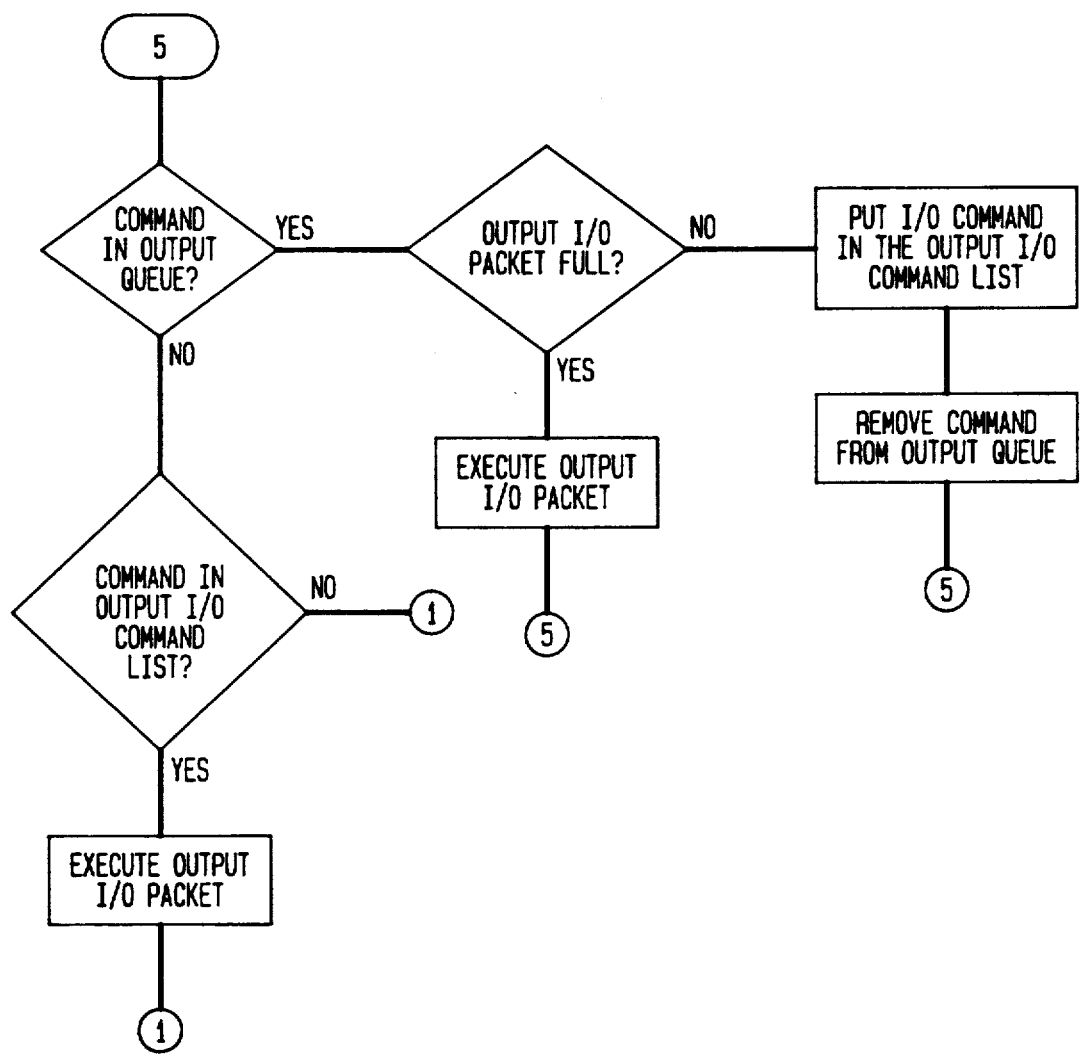
FIG. 7 is a flow diagram for an "output scan phase" for one embodiment of the invention, relative to the scanner of FIG. 2.

The state messaging scanner 118 (see FIG. 2) performs three basic functions. The first function is a primary scan phase simplistically illustrated by the flow diagram of FIG. 5. After the primary scan phase is completed, if necessary a secondary scan phase as shown by the flowchart of FIG. 6 is entered into. Upon completion of the secondary scan phase of FIG. 6, the scanner 118 is programmed to enter an output scan phase as shown by the flowchart of FIG. 7. These three phases are described in greater detail below.

With further reference to the state messaging scanner 118, as shown in FIG. 2, it may be helpful in illustrating the various embodiments of the present invention to describe each element and data path of scanner 118, and the software enabled functions thereof. The descriptions are given below in tabular form for the sake of brevity, as follows:

| | |
|---|---|
| Digit Sender Logic 1 | These routines control the digit sender data base. |
| Primary Scan I/O Packet 2 | I/O packet executed to read the scan flag registers 124. |
| Primary Scan Enable List 3 | I/O commands used to read the scan flag registers 124. |
| Primary Scan Readback 4 | List of the scan flag registers 124 read back from the cards. |
| Scan Flag Bit 5 | A bit set indicates that the associated channel has undergone a state change. |
| Input Shelf Map 6 | List of last input I/O command used for each shelf. |
| Secondary Scan Vector 7 | List used to hold the channel index for all of the channels being scanned in the secondary scan phase. |
| Secondary Scan Enable List 8 | I/O commands used to read the channel status registers 138. |
| Secondary Scan Packet 9 | I/O packet used to read the channel status of channels that have changed state. |
| Secondary Scan Readback 10 | Contains the new states for channels that have changed state. |
| Accessing Current Channel State 11 | The current state of a channel is used to determine the significance of the new state. |
| State Action Table 12 | The state action table determines the action to take for each new state based on the current state. |
| Channel Attribute Structure 13 | Contains the attributes and status information about each channel in the system. |
| Accessing Channel Attribute Structure 14 | During the secondary scan the channel index is obtained from the secondary scan vector list. |
| State Processing Routine 15 | Each state transition causes a series of state processing routines to be called. |
| Sending Call Processing Event 16 | Some state processing routines send events to the high level software. |
| Sending Channel Command 17 | Some state processing routines send commands to the channel. |
| Digit Sender Empty 18 | If a digit sender empty event is seen, the digit sender logic is called. |
| Sending Digit 19 | If a sender ready event is received and more digits remain to outpulse, the digit sender logic will queue a send digit command. |
| Updating Current State 20 | Most state processing sequences cause the current state in the channel attribute table to be updated relative to individual channels. |
| Processing Commands 21 | Commands from other software systems are passed to the output logic. |
| Working Queue 22 | Used as a temporary store for entries in the overflow queue. |
| Output Queue 23 | Contains commands queued for output in the current scan. |
| Valid Command Table 24 | Used to validate channel commands. Indicates that a command is valid in the current channel state. |
| Output Command Validation 25 | A channel command being output is validated using the valid command table. |
| Accessing Current State 26 | To validate a command the current state is obtained from the channel attribute structure. |
| Generating Output Enable 27 | An output I/O command is generated using the I/O command template from the channel attribute structure. |
| Storing Output Enable 28 | The output I/O command generated from the channel is stored in the output I/O command list. |
| Output Enable List 29 | The output I/O command list contains the output I/O commands that are to be outputted during the current scan. |
| Storing Output Data 30 | The data associated with the output I/O command is stored in the output data list 31. |
| Output Data List 31 | Contains the output data used by the output I/O commands. |
| Multiple Output enables 32 | Some commands require more than one I/O command. All of these I/O commands are stored in the output I/O command list. |
| Multiple Output Data 33 | Some commands require that more than one data item be sent. All of the data is stored in the output data list. |
| Output Packet 34 | The output I/O packet controls the processing of the output I/O commands and data. |
| Overflow Queue 35 | Contains commands that could not be outputted during the current scan because of channel or card constraints. |

-continued

| | |
|---|---|
| Emptying Overflow List 36 | After commands are sent, the commands in the overflow queue 35 are moved to the working list. |
| Output Logic 37 | Processes commands and puts them in the appropriate queue. |
| Moving Commands to Overflow List 38 | If a command cannot be output on the current scan, they are moved to the overflow buffer 35. |
| Output Shelf Map 39 | List of last output I/O command used for each shelf. |
| Retrying Status Reads 40 | Error retries are placed in the retry vector 41. |
| Retry Vector 41 | Used to store the channels being retried for any reason. |
| Emptying retry Vector 42 | At the start of each scan the retry vector is analyzed and entries removed if necessary. A secondary scan is initiated for these entries. |
| Putting Entries In The Overflow Queue 35 via 43 | New entries are put in the overflow queue 35 if they cannot be processed during the next scan. |
| Emptying Working Queue 22 via 44 | At the end of the output phase any entries in the working queue are reentered into the output logic. |

A standard protocol is associated with the state messaging scanner 118. Before describing in detail the three phases of operation of scanner 118, the protocol is first described immediately below.

Channel Commands

Channel commands are those that apply to one particular channel (except for the channel roll commands, which affect two channels but are sent as channel commands to either one, or both, of the channels). Channel commands are written by software into the channel control register 142 (see FIG. 4). There is one such register for each channel on a card. Commands written to this register 142 are buffered as described previously. However, commands are only guaranteed to be executed at a rate of one normal command and one gain command each 10.0 milliseconds even if more commands are received in a burst.

The channel commands are used primarily to send network signalling and may cause the state machine in the firmware to move from one (internal) state to another during processing of a phone call. They are also used for several other purposes: to move the channel in and out of service, initiate testing states, do dynamic configuration and do static channel configuration. The commands used for dynamic configuration and static channel configuration are described here and not in the section on configuration commands because they use the channel control registers 142.

Channel commands are not generally accepted when the associated card is in a card state other than "normal". The single exception is that during line errors commands to channels which maintain calls should be buffered (as normally done) rather than logged as errors. This command should not be executed until the line error condition ends.

Command Description

The channel commands can be divided into four areas. These include state transition commands, testing-/integrity commands, configuration commands and card-specific commands. Each type is discussed below.

In many descriptions, typical allowable and disallowable states are discussed.

State Transition Channel Commands

The channel commands affecting the state transitions of a call are listed here in alphabetical order:

ANSWER—An incoming call has been answered by the software. Firmware marks the call as stable, so that it will not be dropped on a warm or warm DBV (database validate) reset, and sends any required answer supervision signal to the network.

GLARE ACKNOWLEDGE—Software has acknowledged a glare condition reported by the firmware and has aborted or rerouted the outgoing call. Firmware can now report its current status relative to qualifying the incoming seizure. If the incoming seizure has not been fully qualified, the channel status reports the last firmware state. If the seizure has been qualified, the channel status is set to "incoming seizure". If a rotary (or DTMF, (dual tone multifrequency) if supported on the card) digit has subsequently been qualified, the channel reports the digit received status.

INCOMING END-OF-SELECTION (NUMBER FREE)—Once dialing is complete on an incoming call, software sends this command to disable digit detection and enable flash qualification on the channel, and to send an appropriate end of selection signal to the network. This command does not cause the channel to report a new status.

Some protocols define more than one end-of-selection signal. This command is sent when the called number is free. On some networks this command is also sent to indicate an error condition.

INCOMING END-OF-SELECTION (NUMBER BUSY)—Once dialing is complete on an incoming call, software sends this command to disable digit detection and enable flash qualification on the channel, and to send an appropriate end of selection signal to the network. This command does not cause the channel to report a new status.

Some protocols define more than one end-of-selection signal. This command is sent when the called number is busy. On some networks this command is also sent to indicate an error condition.

OUTGOING END-OF-SELECTION—Once dialing is complete on an outgoing call, software may send this command to disable digit detection and enable flash qualification on the channel. This command also marks the call as stable, so that it will not be dropped on a warm or warm DBV (database validate) reset.

PROCEED-TO-SEND—After a trunk is seized incoming, software sends this command when it is ready to receive digits (and has attached an external register, if necessary). This command causes firmware to send a proceed-to-send (PTS) signal to the network if one is defined. This command does not cause the channel to change state. On trunks which do not support PTS, (pure time sharing) signaling, digits may be received prior to this command. It may be desirable for firmware to buffer such digits, but if it cannot, any such digits should be reported normally. All cards must support this command.

RECALL—The firmware must send a recall signal to the network. This usually means send a flash over a trunk. This command is valid only after an end-of-selection command has been received. After the flash is sent, the firmware waits for a delay before outpulsing timeout and reports the outgoing selection state.

RELEASE—Software has finished with this call. In other words, the PBX side has hung up. This command is used both when software initiates the release (a release request in some networks) and when the network released first (a release acknowledge in those same networks) and software is simply responding. The firmware releases the channel, waits for any network release signal and possibly guard timing, and then reports idle status. It is desirable that dynamically configurable parameters (such as gain) revert to a default value on transitions to idle but this is not possible on devices using a SICOFI filter.

This command is also used to terminate ringing when a call is abandoned.

RELEASE REQUEST—This command is used on networks supporting re-ring to allow software to request that the network release the trunk. When firmware receives this command, it sends a release request signal to the network, but does not change state. The network should respond with either a network release or re-ring signal.

RING ON—Connect ringing voltage to the line or trunk to alert the distant end. The channel will continue to report "idle" while doing ringing. This command is used when ring cadencing is done by software. RING OFF is used to disconnect ringing voltage for cadencing reasons, and RELEASE is used to actually terminate ringing if the call is abandoned. There is an escape timer in firmware such that ringing voltage cannot be continuously applied to the network.

RING ON 1—Begin ringing using configured or hardcoded ring cadence 1 (typically configured to be a single ring). A RING OFF or RELEASE command is used to terminate ringing. The channel will continue to report "idle" while doing ringing.

RING ON 2—Begin ringing using configured or hardcoded ring cadence 2 (typically configured to be a double ring). A RING OFF or RELEASE command is used to terminate ringing. The channel will continue to report "idle" while doing ringing.

RING ON 3—Begin ringing using configured or hardcoded ring cadence 3 (typically configured to be a triple ring). A RING OFF or RELEASE command is used to terminate ringing. The channel will continue to report "idle" while doing ringing.

RING OFF—Disconnect ringing voltage from the line or trunk, or terminate cadenced ringing. This command should be executed in any state so that software has a safety mechanism to turn off spurious ringing.

SEIZE—Software uses this command to initiate an outgoing call. Firmware seizes the network, but continues to report the "idle" status until any required seize acknowledgement and/or proceed-to-send signal is received from the network. Once any required signal is received, the channel reports Outgoing Selection.

SEND DIGIT—Outpulse the rotary digit specified in the command to the network (and/or DTMF [dual tone multifrequency] outpulsing if supported on the card). The channel continues to report outgoing selection while this command is being executed. The channel signals software that another digit can be sent by setting the scan flag for the channel as it begins the interdigit pause after completing a digit. If a stop dial signal is received from the network, firmware will continue outpulsing any digit in progress, but will not begin a new digit nor set the scan flag again until the stop dial signal goes away. Note that stop dial signaling never occurs in conjunction with DTMF dialing.

The digits to send are numbered 1 through 10 for rotary (dial 0=10) or 1 through 14, then 16 followed by 17 for DTMF. The value 15 is reserved for the digit overwrite condition, so it is skipped for DTMF.

Integrity/Testing Channel Commands

The integrity and testing commands using the channel control register are listed here in alphabetical order.

Testing commands which initiate test states (and the command which terminates channel rolling) are valid only when channels are in certain inactive states. The exact states for which each of these commands is valid are listed at the end of this chapter, and a more detailed description of the test modes is given in the integrity chapter.

Integrity commands (In-Service, Out-of-Service, Reserve On, Reserve Off) are generally used to reserve channels for testing, to force failed channels to reconfigure, or to take failed channels out of service. These commands are generally accepted in any state, although the effect in some cases is delayed until any call in progress is over. Details are given in the command descriptions.

Channel gain is not adjusting automatically by firmware when test commands are executed, nor is it restored to any value when a test is terminated. It is software's responsibility to manage channel gain during (and after) testing.

ANALOG LOOPBACK ON—Used by integrity software in order to command the channel to perform analog loopback testing. The channel does not report a new status while doing the test. The channel stays in this mode until commanded to terminate testing. However, the test turns off automatically if there is an incoming or outgoing seizure. At the completion of such a call, the channel does NOT go back into analog loopback mode.

The preceding discussion does not apply if analog loopback is the default mode when the channel is idle. For these cards, there are three modes: analog loopback, digital loopback, and in use. In such cases the channel DOES go back into analog loopback when the call has completed without issuing the ANALOG LOOPBACK ON command. The analog loopback summary word will always indicate the actual status of analog loopback, regardless of whether it is default or commanded loopback.

ANALOG LOOPBACK OFF—Used to turn off analog loopback testing. See previous command.

CHANNEL ROLL ON—The ability for two channels to swap on-card circuitry (but to route signals to the normal connectors at the edge of the card) is termed "channel rolling". This capability is a useful maintenance aid because it helps determine whether problems are on the card or in the network. A CHANNEL ROLL ON command issued to one channel also affects the other channel of the pair as the circuitry for these channels is swapped. While channels are rolled, they support all normal functions (telephony, configuration, other testing), and each reports the normal status appropriate to the activity on the channel. Termination of the rolled condition is done only with the CHANNEL ROLL OFF command (or a cold reset).

Two consecutive CHANNEL ROLL ON commands do not unroll a channel. The implementation of channel pairing is card-specific and is not always the adjacent channel.

CHANNEL ROLL OFF—Turn off channel rolling. Permissible from inactive states only. See previous command.

DIGITAL LOOPBACK ON—Used by integrity software in order to command the channel to perform digital loopback testing. The channel does not report a new status while doing the test. The channel stays in this mode until commanded to terminate testing. However, the test turns off automatically if there is an incoming or outgoing seizure. At the completion of such a call, the channel does NOT go back into digital loopback mode. Note that if this command was sent to a channel in an unconfigured state, no seizures will be serviced.

The preceding discussion does not apply if digital loopback is the default mode when the channel is "idle". For these cards, there are three modes: analog loopback, digital loopback, and in use. In such cases the channel DOES go back into digital loopback when the call has completed without issuing the DIGITAL LOOPBACK ON command. The digital loopback summary word will always indicate the actual status of digital loopback, regardless of whether it is default or commanded loopback.

DIGITAL LOOPBACK OFF—Used to turn off digital loopback testing. See previous command.

IN SERVICE—This command is issued to bring up a channel currently out-of-service or to reconfigure a channel already in-service. This command is executed in all channel states. The firmware immediately drops any calls currently in progress and acknowledges that it is ready to be reconfigured by reporting its status as unconfigured-filter (or unconfigured-1, if filter configuration is not supported). If the channel was in "channel failure" or "out-of-service", the internal channel initialization tests are executed. A card may optionally execute these tests whenever this command is received. A channel should go to "channel failure" if the test fails (except that out-of-service channels remain out-of-service).

An in-service command to a channel cancels any pending out-of-service command.

NAIL-UP TEST ON—Enable the voice/data path for testing purposes. Incoming and outgoing seizures are ignored. The channel reports the nailed-up status.

NAIL-UP TEST OFF—Disable the voice/data path. See previous command.

OUT-OF-SERVICE—This command is issued to take a channel out of service. The channel enters the out-of-service state immediately unless a call is in progress. In this case, it waits until the call has been completed. If the channel was in "channel failure", the internal channel initialization tests are executed and the channel remains in channel failure if these tests fail.

A configurable or hardcoded default busyback signal (idle, seized, unavailable) is sent to the network while the channel is in the out-of-service state.

RESERVE ON—This command is issued to reserve a channel for testing. If the channel is idle, it goes immediately to the reserved state. If a call is in progress the channel goes to "reserved" instead of "idle" at the end of the call. In this state a channel will ignore incoming and outgoing seizures but will accept all test commands described in this section. If all channels are in "reserved" the card will accept all card test commands as well.

A configurable or hardcoded default busyback signal (idle, seized, unavailable) is sent to the network while the channel is in the reserved state.

RESERVE OFF—This command causes a channel in the "reserved" state to go to "idle".

Configuration Channel Commands

Some configuration commands are sent via the channel control register 142, others are sent via the configuration type register 148. The ones discussed here use the channel control register 142. These configuration channel commands also make use of the configuration data register 148. Data pertaining to the command is first written into the configuration data register 148. Then, when the firmware receives the command, it looks in the configuration data register 148 for the necessary data to execute the command. There is only one configuration data register 148 (16 or 64 bytes long) on a card.

As long as no overwrite of the configuration data occurs, software may send dynamic configuration while a channel (or channels) is (are) in a unconfigured state.

Among the commands listed below, there are eight for adjusting gain. For these commands, the transmit path is (note this carefully) from the network to the TDM bus and the receive path is from the TDM bus to the network. If the card supports a default gain in "idle" and it receives a dynamic gain adjust command while in an unconfigured state, at the end of configuration when it goes to the "idle" state, it adopts the default gain just as it would in all other cases.

The configuration commands using the channel control register are listed here in alphabetical order:

BOTH-XMT HIGH RCV HIGH—Adjust the gain in both the channel's transmit and receive paths. Use the high index table with both the transmit gain value and the receive gain value.

BOTH-XMT HIGH RCV LOW—Adjust the gain in both the channel's transmit and receive paths. Use the high index table with the transmit gain value and the low index table with the receive gain value.

BOTH-XMT LOW RCV HIGH—Adjust the gain in both the channel's transmit and receive paths. Use the low index table with the transmit gain value and high index table with the receive gain value.

BOTH-XMT LOW RCV LOW—Adjust the gain in both the channel's transmit and receive paths. Use the low index table with both the transmit gain value and the receive gain value.

END FILTER CHANNEL CONFIGURATION—A complete block of filter coefficient data for this channel has been written to the configuration data register 148. The firmware copies this data to the specified channel. The channel reports a status of UNCONFIGURED-1 when it has completed processing the data. If an improper sequence number is encountered, a sequence error will be reported and the expected block number will be re-initialized to indicate the initial block.

If a busy channel with a pending configuration request receives this command, an error will be logged, but the pending configuration request will not be canceled.

END STATIC CHANNEL CONFIGURATION—A complete block of static channel data for this channel has been written to the configuration data register 148. The firmware copies this data to the specified channel. The channel reports a status of UNCONFIGURED-2 OR "idle" when it has completed processing the data.

If a busy channel with a pending configuration request receives this command, an error will be logged, but the pending configuration request will not be canceled.

RCV HIGH GAIN ADJUST—Adjust the gain in the channel's receive path with the gain index stored in the configuration data register 148 using the high index table.

RCV LOW GAIN ADJUST—Adjust the gain in the channel's receive path with the gain index stored in the configuration data register 148 using the low index table.

XMT HIGH GAIN ADJUST—Adjust the gain in the channel's transmit path with the gain index stored in the configuration data register 148 using the high index table.

XMT LOW GAIN ADJUST—Adjust the gain in the channel's transmit path with the gain index stored in the configuration data register 148 using the low index table.

Card-Specific Channel Commands

Certain cards may require channel commands that are unique to that card. There are insufficient possible command codes to assign a unique command code in each such case. Therefore, five codes have been selected to be used for such special purpose commands. These are referred to as card specific channel command codes. The various commands currently assigned to these codes are identified in an appendix. The definition of a new command using one of these codes must be incorporated in this specification and requires the same approval as any other change.

Channel Status and Descriptions

This section describes the complete set of channel states which may appear in firmware status reports in the channel status registers in the BIC. This list is broken into four parts: telephony states, configuration states, integrity/testing states, and card-unique states.

CARD STATUS OVERRIDE—This channel status signifies that the channel is not currently capable of performing normal channel-based functions due to an overriding card condition (reported in the primary card status register 120 [see FIG. 3]) This state is sent under the following conditions:

After a cold reset or a warm (DBV) reset which detected corrupted configuration.

On channels which have calls drop while entering or in a card state other than "normal".

On non-busy channels which receive channel commands while the card state is not "normal".

Telephony States

Telephony states are all channel states which may occur to report activity associated with calls taking place.

ANSWER—The firmware has received an answer signal from the network in an outgoing call, or an extension has gone offhook to place a call.

DIGIT ERROR—A digit overwrite condition has occurred while the firmware is qualifying incoming digits, or an invalid digit (containing too many dial pulses, for instance) has been received.

DIGIT RECEIVED—A digit has been detected by the firmware; its actual value is contained in this status report.

Legal digits are in the range 1-14 and 16-17. The normal digits are 1-10 (10 is used to report zero), and the extended DTMF digits are 11-14 and 16-17 (skipping the overwrite report value). Note that incoming digits are qualified only in the incoming seizure state.

GLARE—The firmware has detected a simultaneous seizure from both software and the network. This status is reported by the firmware:

when it has received a seize command and it detects an incoming call; or when it is validating an incoming call or has reported an incoming call to software and it receives a seize message from software.

Firmware will process the incoming call while handling the glare condition, and when the glare acknowledge command is received, it will report the current status of the network (the previous state if the seizure has not been fully qualified, "incoming seizure" if the seizure has been qualified, "digit received" if a digit has been received).

IDLE—The network is available for use. This status is reported at the end of a call following any necessary release guard timing, or upon successful receipt of configuration data from the software. If a card supports a default idle gain the transition to idle will reset the gain to this value. This gain value remains in effect for all incoming or outgoing calls until a dynamic gain configuration is received. This status continues to be reported while an incoming seizure is being qualified, after a seize command until any required network seize acknowledge or proceed to send signal is received, or while the channel is doing ringing.

INCOMING SEIZURE—The firmware has been signalled by the network that there is an incoming call. A proceed to send command should be accepted by the firmware regardless of whether the trunk supports proceed to send signaling or digits. An incoming call will remain in this state internally for the duration of the call (although the channel status report may be different—refer to the discussion of the state diagram).

NETWORK RELEASE—The network has released the call. Firmware will automatically send any release acknowledge that is required by the network. Software uses this report to clear the existing call and then it sends a release command to firmware. The firmware will not send a release to the network until the release command is received. (Note the distinction between the release acknowledge signal, which simply acknowledges the network's release request, and the outgoing release signal which clears the line).

When the other party clears first, software will send a release command before firmware has detected release from the network. Under these circumstances there is no need for the firmware to send the release status report as software has already cleared the call and is waiting for "idle" (or another incoming call) from the channel.

Depending on network requirements, guard timing may be required on some or all calls. Guard timing may be performed either before or after the idle status is reported. In general, if guard timing is short, firmware should report "idle" as it starts guard timing, and should buffer any seizure commands until it completes the guard interval. If guard timing is long, firmware should not report "idle" until the guard interval is complete. In this case, it should log an error if it receives a seizure command, but it should go immediately to incoming seizure if a network seizure is qualified.

NO NETWORK PROCEED-TO-SEND—The firmware has successfully seized a channel (and may have detected the seize acknowledge from the remote end) but it has failed to receive a proceed-to-send signal (PTS). An example of the use of this status report is when an E & M tie trunk configured as wink start does not return a wink after being seized by the firmware. (See No Network Seize Acknowledge). Firmware should drop the outgoing seizure when it enters this state. Software should send a release command to return the channel to "idle".

NO NETWORK SEIZE ACKNOWLEDGE—The firmware has seized a channel but the network has not sent the seize acknowledge signal. An example on the use of this status report is an earth-calling/ground-start CO trunk that does not give a seize acknowledge after being seized by the CBX. (See No Network Proceed-To-Send). Firmware should drop the outgoing seizure when it enters this state. Software should send a release command to return the channel to "idle".

OUTGOING SELECTION—The firmware has seized the channel, and the network is ready to accept any digits. After sending each digit, the channel bit in the BIC scan flags register is set, so that system software knows that it is okay to send the next digit. The channel will also go to this state after a recall command.

The voice path is enabled so that DTMF digits may be sent.

PERM—The firmware has not seen the network release signal. This status is reported after a trunk has been released from the firmware end and the expected release signal from the network has not been detected.

RECALL—This status is reported when an incoming flash is detected.

TOLL CALL—An incoming call has been determined to be a toll call, so the call should be given higher priority by software. The network provides this signal along with the first digit, and firmware reports this event immediately prior to the first digit.

Configuration States

Configuration states are the channel states associated with configuring channels after a cold reset (or a warm [DBV] reset which detects corrupted configuration) or a configuration request sent by software.

UNCONFIGURED-FILTER—The firmware requires filter (SLAC or equivalent) configuration data and is therefore requesting this data from software. In this state software may send multiple blocks of filter configuration parameters. Interpretation of the data is card specific. This state, if required, precedes the Unconfigured-1 state.

UNCONFIGURED-1—The firmware does not have any channel configuration information and is therefore requesting this data from software. Interpretation of the data is card specific. After this parameter block is verified and accepted, the channel goes to "Unconfigured-2" if further channel configuration is required. Otherwise it goes to "idle".

UNCONFIGURED-2—A second block of configuration information is required. After this second block is verified and accepted the channel goes to "idle".

The primary, secondary, and output scan phases will now be described in greater detail. Reference is made to FIGS. 2-8 in completing the description of the operation of the system, with FIG. 2 being the primary figure.

The Primary Scan Phase

The primary scan phase begins when the primary scan I/O packet 2 completes execution. The primary scan I/O packet is executed periodically by the I/O software. The packet executes a list of I/O commands 3 that read the scan flag registers 124 (see FIG. 3) for all state messaging cards 104, 106, 108, 110, 112, and 114. Completion of the primary scan I/O packet 2 means that the primary scan readback area 4 contains the contents of the scan flag registers 124 of all state messaging cards. The values of the scan flag registers 124 are used to determine which channels have changed state and thus need to be scanned in the secondary scan phase.

A bit set in a scan flag register 124 indicates via data line 5 (see FIG. 2) that a state change has occurred. The I/O command to read the new state is fetched from the channel attribute structure 13 for the channel. The index into the channel attribute structure 13 is obtained from the location of the scan flag register 124 in the primary scan list and the position of the bit in the register 124. The index is saved in the secondary scan vector 7. The I/O command is added to the secondary I/O command list 8. The location to use in the secondary I/O list 8 is found by a search. The search is started at the location indicated in the input shelf map 6. The input shelf map 6 is updated with the last location used, for each shelf, in the secondary I/O command list 8. After all scan flags registers 124 have been processed or the secondary scan packet 9 is full, the secondary scan I/O packet 9 is executed.

The Secondary Scan Phase

The secondary scan phase begins when the secondary scan I/O packet 9 has completed execution. This means that the secondary scan readback 10 area contains the contents of the channel status registers 138 of all the channels that have experienced state changes. Each of the channel status register 138 values is a new state and is processed during this phase.

Both the parity 141 and data valid 140 bits (see FIG. 3) of each state are checked. If the parity 141 is wrong, the state must be reread on the next scan (regardless of the scan flag 126). The reread is performed by setting a bit via data line 40 in the retry vector 41. At the beginning of the primary scan phase this vector is analyzed and secondary I/O commands are generated onto data line 42 for channels in the vector. If the parity 141 remains wrong, an error is logged. The data valid bit 140 must be checked also. If the data valid bit is incorrect, the new state is ignored.

If the state is valid, it can be used along with the last state via data line 11 to index into the state action table 12. The last state is obtained from the channel attribute table 13 using the index on data line 14 saved in the secondary scan vector 7. The state action table 12 indicates the appropriate action to take. The actions provided in state processing table 15 include duties like passing an event (i.e.-an address of a software routine to be executed by CPU 102, for example) to higher level software via line 16 or sending a command to the channel via data line 17 to output scanner 37. One possible state action on line 18 indicates that a channel is ready to outpulse a digit. If this occurs, a digit sender routine 1 is called to communicate this fact. The digit sender routine 1 may queue a send digit command 19 for processing by the output phase.

Before the secondary scan phase is over, the current state may be copied into the channel attribute structure 13. This occurs when a true state transition is seen. Some events such as a retry of an error do not update the current state.

If all the scan flags, from the primary scan, have not been processed by the first secondary scan packet 9, additional packets are generated and processed.

The Output Scan Phase

The output phase begins immediately after the secondary scan phase has been completed. There is no suspension. It is also possible for the output phase to begin immediately after the primary scan phase. This occurs if there is no need for a secondary scan phase, in that channels of interest have not changed state.

The first step is to lock the output queue 23 (see FIG. 2). While the queue 23 is locked, new commands queued to the output scanner 37 are instead placed via line 43 into the overflow queue 35. This insures that new entries queued to the output scanner 37 will not interfere with the output phase. During the output phase, the commands found in the output queue 23 are sent to the appropriate channels or cards. Several duties are performed for each command.

The command is checked for validity using the command valid table 24. This table indicates whether the command from line 25 is valid in the current state 26. If the command is out of context, it is not sent. Invalid commands representing race conditions do not cause an error to be logged. This is because race conditions are expected in some situations. A command may have been queued before a state change was detected. As a result of a state change, the command may no longer be necessary.

Other invalid commands may represent a serious inconsistency between the hardware and high level software. The scanner will take action to inform the calling routine that the command could not be sent.

Based on the logical command, the appropriate I/O command is formed. An I/O command template is requested from command table 24 via line 27 to the channel attribute structure 13 to speed up the process. The I/O command template is in the channel attribute structure 13. Once the I/O command is formed, it is placed in the output I/O command list 29 via data line 28 from channel attribute structure 13. The location is determined using information in the output shelf map 39 and the channel attribute structure 13. These structures contain the last output I/O command used for the current shelf and the current card or channel. After the I/O command is put in the list, the data for the I/O command is generated onto line 30. The data for the I/O command is often the state messaging command itself. For transmitting gain adjust and configuration data, however, the data value is not a state messaging command, but is actual data. In both cases the data is moved into the output data list 31.

Commands requiring gain adjust or configuration data require a slightly different approach than those without data. One difference is that multiple I/O commands and data are added to the I/O command and data lists. The set of data is passed by the calling procedure. The set of I/O commands 32 is built in order to pass this data 33 to the cards.

Once all commands in the output queue 23 have been processed or the packet is full, the output I/O packet 34 is executed. It is possible for the output queue to require more than the number of I/O commands in the output I/O command list. In this case, any commands which cannot be serviced in the current packet are left in the output queue 23.

When the output packet 34 finishes execution, additional output packets are generated until the output queue 23 is emptied. After the last output I/O packet 34 has been executed, each command in the overflow queue 35 is given a chance to be added to the output queue 23 for execution in the next scan. This is accomplished by moving via 36 the entries in the overflow queue 35 to the working queue 22. Each entry in the working queue is then added via 44 to the output queue 23. Normal add logic will place the entries in the appropriate queue. A full discussion of command overwrite is provided below.

Queuing State Messaging Commands

This function can be invoked in the following ways:
By high level software to send commands necessary to complete a call.
By the ringing software to queue commands to start and stop a phone ringing.
By the digit sending software to queue commands to send digits.
By gain adjust software to modify trunk gain values.
By configuration download task to queue blocks of configuration data.
By the scanner in the secondary scan phase to queue commands.
By the scanner 118 to queue the commands in the working queue 22.

This function puts commands to be sent to the cards into the command buffer 143 (see FIG. 4). It has the very important role of preventing command and data overwrite. This is a significant problem in which commands or data may be written to the card so fast that the card may not have time to process them before being overwritten by subsequent commands or data. The problem is most prevalent in the channel command register 142 and configuration data register 144. The other registers are not used often enough or by a wide enough variety of commands to present a problem.

Preventing Command Overwrite

A four command buffer 143, 147 exists for each channel control register 142 (see FIG. 4), so a maximum of four commands can be sent to the same channel in one scan. The four commands in the buffers 143, 147 (two in each buffer) can consist of two gain or dynamic configuration commands and two other commands. If a command to the same channel is passed that cannot be processed in the current scan, it is put in the overflow queue 35. The overflow commands are processed for execution in the next scan. Gain adjust commands have priority over all other configuration commands. This is because it is important that the gain be set correctly as soon as possible. A gain adjust command is always put in the output queue 23. Any end configuration commands for the card to which the gain adjust is being sent must be moved via line 38 to the overflow queue 35. This is necessary to prevent data overwrite.

Preventing Data Overwrite

Data overwrite is a problem with gain adjust and end configuration commands. All use the configuration data register 144 (see FIG. 4). End configuration commands use the entire register 144. Gain adjust and dynamic configuration commands use a two byte portion reserved uniquely for the channel receiving the command.

Because each channel has its own space in the configuration data register 144, there is no problem of data overwrite between gain adjust commands. The same is true for dynamic configuration commands. Each channel has its own two byte area in which to pass data. However, because all types of dynamic configuration commands use the same two byte area, they must not be issued during the same scan to the same channel. To solve the conflict, gain adjust commands are given precedence over other types of dynamic configuration. This is because gain must be set quickly to ensure adequate transmission on the line. Thus, a dynamic configuration command (which is not a gain adjust) is moved to the overflow queue 35 if a gain adjust command is queued for the same channel. Similarly, if a gain adjust is already in the output queue 23 when a different type of dynamic configuration command is queued, the dynamic configuration command is placed in the overflow queue 35.

Data overwrite between dynamic configuration and end configuration commands must also be prevented. An end configuration command uses the entire configuration data register 144 (see FIG. 4) and, therefore, locks out all dynamic configuration commands to all channels on the card. Dynamic configuration commands are given precedence in this case. They are involved in calls on active channels while end configuration commands are sent to channels which are unconfigured. An end configuration command passed to this function is put in the overflow queue 35 if any dynamic configuration commands are in the output queue for the same card. Similarly, if a dynamic configuration command is passed to this function, and an end configuration to the same card is in the queue 23, it is moved via line 38 to the overflow queue 35. Similarly, this function also checks for two end configuration commands to the same card. Only one is executed per scan. Subsequent end configuration commands are stored in the overflow queue 35, until there is no contention. Then, they are executed in the order queued, one end configuration command per output phase.

Output Buffer Characteristics

The output buffer is implemented as four separate doubly linked lists. When a new command is received by output scanner 37, a buffer is allocated and filled in with information from the call. The new entry is evaluated and placed either on the output queue 23 or the overflow queue 35. The new entry may force an entry to be bumped via line 38 from the output queue 23 to the overflow queue 35.

Restart Processing

After a software restart, all channels must be scanned. As part of the restart processing, a reset command is sent to all cards. The reset causes all scan flags 122 to be set (see FIG. 3), so there is no need to read the scan flags registers 124. The channel status for all channels is read. To do this, the primary scan readback buffer 4 (see FIG. 2) is set to indicate that all defined and active channels have an event. The normal secondary scan logic processes the primary scan readback buffer to accomplish the scan of all channels.

The restart code sets the last scan state in the channel attribute structure 13 to either RESTART_CONNECTED or RESTART_IDLE based on whether software thinks a call is active on the channel. The normal state action table 12 contains processing for these states. This processing is intended to correct any inconsistencies between the hardware and software state of the call.

If the state from the secondary scan 10 is consistent with the current state (hardware IDLE and RESTART_IDLE or some connected state and RESTART_CONNECTED) then no action is performed except updating the current state via data line 20. If an inconsistency is found, the hardware or software portion of the call that remains is torn down. Commands from State processing sequencer 160 are sent via line 17 to hardware (output scanner and logic 37) if necessary to put the call in an idle state. Events are sent on line 16 to the high level software if necessary to initiate a tear down of the call.

Restart inconsistencies occur because the events that make the call permanent in hardware and software do not occur simultaneously. If hardware marks the call as permanent, but software has not, a restart causes software to drop the call. A similar event occurs if software marks the call as permanent before the hardware command to make it permanent is processed.

Retrying Status Reads

Various hardware problems or other software conditions may make it necessary to reread or delay reading the status from a channel. This function is accomplished using a retry vector 41 (see FIG. 2). A bit is set in this vector 41 for each channel that needs to be reread. The channel attribute structure 13 is updated to indicate why the channel is in the retry vector 41. At the start of the primary scan phase, the vector 41 is analyzed and secondary I/O commands generated onto line 42 to accomplish the reread by the I/O enable 8 of secondary scan packet 9.

State Action Table

The state action table 12 (see FIG. 2) is the mechanism used to translate raw hardware states into actions to be performed by the software. A particular action is triggered by the transition between states. For example, the transition from IDLE to INCOMING SEIZURE cause the execution of a specific processing sequence. To allow the state transitions to be detected, the current state of each channel is saved in the channel attribute structure 13.

Figure 8:
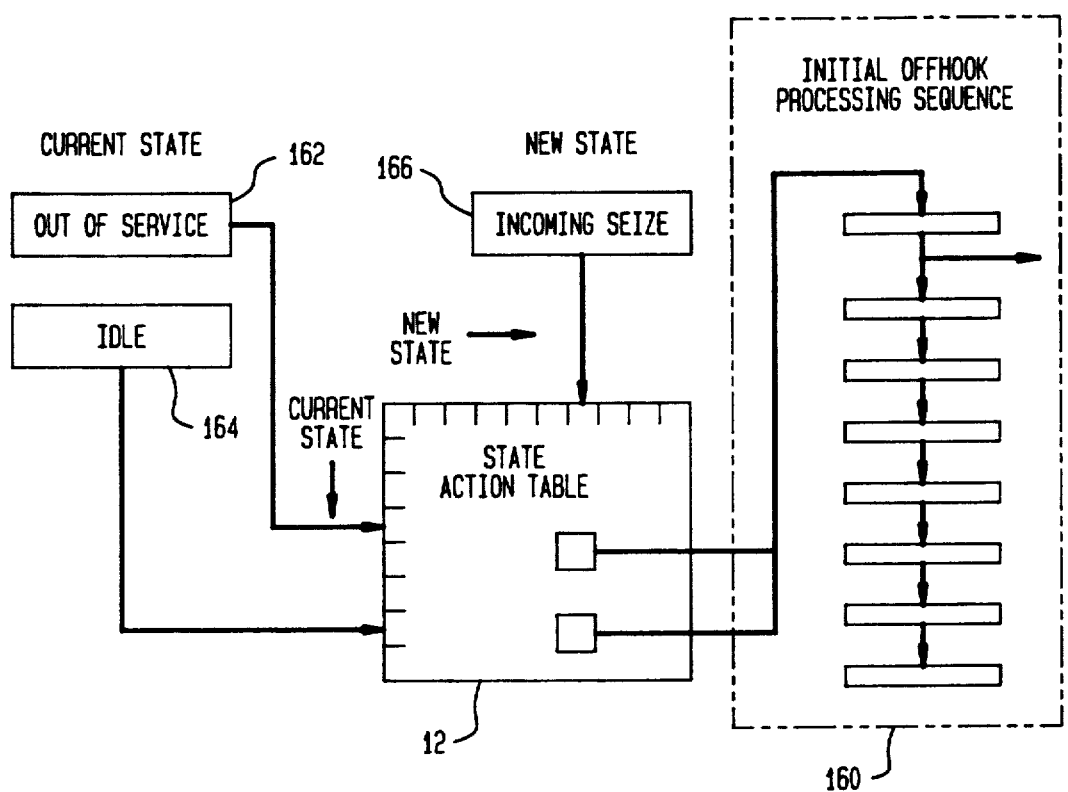
FIG. 8 is a block diagram illustrating processing for a state action of one embodiment of the invention.

FIG. 8 shows the process of accessing the state action table 12. The table 12 is implemented as a two dimensioned array. One dimension being the current hardware state (162 and/or 164) and the second being the new hardware state read by the scanner 9. In this example current state 162 is shown as "out of service", and current state 164 is shown as "idle". The element referenced by these two indexes defines a vector into a separate table. Entries in the vector table 12 define a series of routines that are called to perform the required state action processing. The routines are called in sequence to perform the desired processing for the transition. Provision is made for a processing routine to skip the rest of the processing sequence. A new state 166, shown as an "incoming seize" in this example.

In practice several different state transitions may have the same state action processing sequence. This fact reduces the number of processing sequences defined. The state action table is implemented as an integer array. The vector table 41 (see FIG. 2) is an array of pointers to functions. These functions are designed as simple routines performing discrete portion of the processing for a full event.

Synchronization on Restart

Following a restart, it is possible that the software current channel state may not match the current state for a channel on the state messaging card. This inconsistency is resolved by logic in the state action table 12. During the restart the software's current channel state is set to RESTART_IDLE or RESTART_CONNECTED based on whether software thinks a call is present on the channel. When the scanner starts up, it forces a read of each channel's current state. The action performed when the hardware state is received contains the necessary steps to set the hardware and software into consistent states. In most cases the hardware state and the current state are compatible so no action is needed. If the states are incompatible, hardware commands or software events are sent to cause the states to be consistent.

Error Checking and Recovery

Error checking and recovery software is included to insure near normal operation of hardware exhibiting intermittent errors. This recovery would include an environment where intermittent I/O errors are encountered.

Channel Status Parity Check

Before a value in a channel status register 138 is used, the parity of the register is checked (FIG. 3). If a parity error is found, the value is discarded and a retry of the read is initiated. The retry occurs on the next scan as part of the normal secondary scan. If the retry does not have a parity error, the channel status is processed by the normal scanner logic. In this case it is expected that the data valid bit 140 may not be set in the channel status register 140.

This processing sequence is intended to correct from two classes of intermittent errors. The first error is an intermittent I/O error. The second class of errors are parity errors caused by the card. The initial read of the card causes the firmware to recalculate the parity of the register. If this corrects the parity error, the retry will return good data.

Scan Flag Validity

The channel status register 138 contains a data valid bit 140, as previously indicated. This bit 140 indicates that the register has not been read since the last time it was changed. If a channel status register 138 is read with the data valid bit 140 reset, it is assumed that a spurious scan flag 122 was read. The spurious scan flag 122 may have been caused by an I/O error or a fault in the card. In either case, the channel status is ignored.

Retry of Illegal State Transistions

During the processing of a state transition, it is possible to identify a class of transitions that cannot occur in a correctly functioning system. These illegal transitions can be caused by two classes of errors. The first class of errors (Class 1) occurs when the new status read is invalid because of an I/O error or a fault on the card. The second class of errors (Class 2) occurs because the software and hardware states are not synchronized. This can occur because of an earlier undetected hardware error or an internal software fault.

When an illegal state transition is detected, the current state is not changed and a retry is performed to read the channel status again. If the error is caused by a Class 1 fault, the retry should return a correct status which can be processed normally. If the error is caused by a Class 2 fault, the status will still cause an illegal transition. In this case the scanner 118 synchronizes the software and hardware state of the channel. This is accomplished by sending commands to hardware and events to software to place both in some common state. The software is sent an abort event if a call was in progress. The hardware command sent is determined by a table lockup based on the current channel status.

Killer Card Protection

A killer card is a card which because if an illogical operating mode affects normal system operations, the killer card logic is not intended to be the main means of detecting and reporting defective hardware. It is assumed that separate system integrity tests and scanners will detect and report the vast majority of such faults. The scanner processing is intended to provide the best level of service possible until the systems integrity initiated actions result in the fault being corrected.

Some of the operating modes that a killer card exhibits include the following:

CONSTANT ERROR INDICATION—The card returns a constant error status each time it is scanned. Attempts to clear the error are unsuccessful. Continuous scanning and clearing of the error may consume an excessive amount of real time.

REPETITIVE EVENT SEQUENCES—The card returns an event or sequence of events at a high rate. The rate of these events is considerably higher than normal network events are generated. Processing these events consumes an excessive amount of real time.

Typically, these errors are characterized by the occurrence of a large number of events over a short period of time. As such, the best protection mechanism is to detect channels producing a large number of events and disabling them. This is accomplished by counting events on each channel. A background audit task checks and clears these counts periodically. If a channel is generating events at too high a rate, the systems integrity data base is updated to reflect a self-test failure on the channel and the integrity test invoked. The test will log an error against the channel and take appropriate action to deactivate the channel. If a failing channel continues to produce too many events, the systems integrity data base is updated to reflect a self-test failure on the card. The systems integrity test will log an error against the card and take appropriate action to deactivate the card.

The detection and recovery mechanisms for some of the expected killer card failures follows below.

Solid Parity Error

If a parity error retry results in the retry count being exceeded, it is assumed that the channel has a solid parity error. No more retries are performed. The event with the parity error is ignored by the scanner. If the scan flag for the channel is set again, the status is read and the parity is checked. If a continuous sequence of parity errors is seen from a channel, the "too many events logic" will disable the channel.

Scan Flag Set In Error

If a scan flag is set in error, it causes the scanner 118 to read a channel status register 138. If this occurs at a high rate, a "too many events logic" will disable the channel.

Too Many Events

Figure 9:
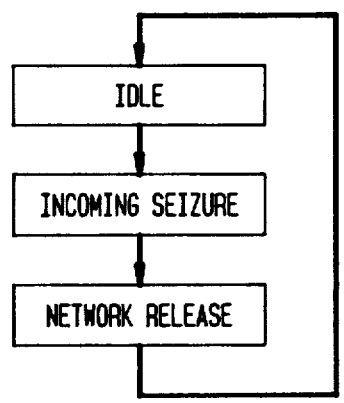
FIG. 9 is a flow diagram showing a repetitive event sequence that causes a channel to be disabled.

A hardware or network failure may cause a channel to report a repetitive event or sequence of events. The event sequence may in itself be legal such as is shown the flow chart of in FIG. 9. If a continuous sequence of events, at an abnormally high rate, is seen from a channel, the "too many events logic" will disable the channel.

Although various embodiments of the invention have been illustrated and described herein, they are not meant to be limiting. Modifications to these embodiments may become apparent to those of skill in the art, which modifications are meant to be covered by the spirit and scope of the appended claims.

What is claimed is:

1. In a computerized system for controlling the interconnection of a plurality of peripheral devices, said system including a system bus, a central processing unit (CPU) connected to said bus, said CPU including storage of a plurality of program routines at given addresses, respectively, a plurality of state messaging cards operable by said CPU for connecting said plurality of peripheral devices to said bus, a state messaging scanner operable by said CPU, software table means included in said scanner for storing commands and program addresses necessary in different combinations for carrying out various functions for interconnecting and operating said peripheral devices, said logic cards each including status registers having a plurality of individual channels for connection to individual ones of said peripheral devices, respectively, said channels being indicative of the state of an associated one of said peripheral devices, the method comprising the steps of:

performing a primary scan routine for detecting, in a repetitive cyclic manner, whether any of said peripheral devices have changed state between successive cycles;

performing a secondary scan routine for extracting from said software table means the required combination of commands and program addresses for operating said CPU to execute program routines, and/or said logic cards into a designed configuration, to permit said peripheral devices of changed state to operate in their respective new states; and maintaining the operation of said peripheral devices that have not changed state between cycles.

2. The method of claim 1, wherein said detecting step includes the step of:

monitoring the channels of said status registers in a cyclic manner for detecting any changes in state of said peripheral devices.

3. The method of claim 1, wherein said detecting step includes the steps of:

scanning the channels of said status registers in a cyclic manner for detecting the state of said peripheral devices at any given time;

storing the states of said peripheral devices obtained in one scanning cycle; and comparing, during a next scanning cycle, the stored state of each one of said peripheral devices from the one prior scanning cycle with the present state to determine if any of said peripheral devices have changed state, for thereafter performing said extracting step for said peripheral devices that have changed state, and performing said maintaining step for said peripheral devices that have not changed state.

4. The method of claim 3, wherein said extracting step further includes:

checking via said secondary scanning means the validity of the present state of the ones of said peripheral devices having changes of state, respectively; and resetting via said secondary scanning means said CPU and the ones of said peripheral devices having invalid states, for obtaining compatibility between said CPU and said ones of peripheral devices for insuring valid states therefor.

5. The method of claim 1, wherein said extracting step includes the steps of:

storing the states of said peripheral devices obtained in one detecting cycle;

storing in a state action table a plurality of commands for actions to be taken in view of the detected changes of state for given ones of said peripheral devices in a subsequent detecting cycle;

comparing the stored states of said peripheral devices from the one detecting cycle with the changed states detected in the subsequent detecting cycle, for determining the action commands to be taken from said state action table in association with each one of said peripheral devices, respectively; and inputting the action commands obtained from said comparing step to a state processing table for obtaining associated addresses of program routines for said CPU to carry out, and for obtaining microcode commands for operating said logic cards and associated said peripheral devices, respectively.

6. The method of claim 5, further including the steps of:

validating said commands before inputting them to said logic cards, and associated ones of said peripheral devices.

7. A computerized system for controlling the interconnection of a plurality of peripheral devices, said system comprising:

a system bus;

a control processing unit (CPU) connected to said bus;

a plurality of state messaging logic card means for connecting said plurality of peripheral devices to said bus;

said plurality of state messaging logic card means each including:

at least one channel status register including a plurality of memory locations associated with channels designated to individual ones of said peripheral devices, respectively, for storing data representative of the state of said peripheral devices at any given time, respectively;

at least one scan flag register associated with said at least one channel status register, said scan flag register including a plurality of single status bit memory locations associated with individual ones of said channels of said channel status register, respectively, whereby the level of said status bits are each indicative of the state of an associated channel at one given time, and the level of said status bits change if an associated channel changes state; and a state messaging scanner connected to said bus, including:
   primary scan packet means for scanning said scan flag registers of each one of said plurality of state messaging logic card means, for detecting the state status of the channels associated therewith, respectively;
   channel attribute structure means responsive to said primary scan packet means, for determining the ones of channels which have changed state;
   secondary scan packet means enabled in the event that one or more of said channels have changed state, for generating commands associated with each channel that changed state, respectively;
   state action table means responsive to both said commands from said secondary scan packet means, and to the previous state of said channels, respectively, from said channel attribute structure, for generating individual action codes associated with said channels of changed state, respectively;
   state processing table means including a list of addresses associated with software routines stored in said CPU, which routines are necessary for carrying out particular actions associated with given changes of state of respective ones of said channels, said state processing table means further including a list of microcode commands for operating said logic cards, and means responsive to said action codes from said state action table means for assembling necessary ones of said addresses for driving said CPU to execute the program routines associated with said addresses, and for assembling the necessary commands for operating said logic card means;
   an output scanner receptive of said list of commands from said state processing table, and commands from said CPU as a result of its executing said software routines;
   an output queue for receiving said commands from said output scanner;
   valid command table means connected both to said output queue for receiving said list of addresses from said output queue, and to said channel attribute structure means for receiving the current state of each associated one of said channels from said channel attribute structure means, respectively, for determining whether the commands are valid, and if valid, for providing signals back to said channel attribute structure means for developing enable signals associated with said channels, respectively; and
   output packet means responsive to said enable signals from said channel attribute structure means for developing I/O and data signals for said channels, respectively, for driving said plurality of state messaging logic card means and CPU to operate said peripheral devices as called for by their respective present states.

8. A method for controlling the interconnection of a plurality of peripheral devices connected to a common bus via logic cards, said logic cards including channel status registers each having a plurality of channels for individual connection to said peripheral devices, respectively, scan flag registers associated with individual ones of said channel status registers for indicating the states of said channels, respectively, and a central processing unit (CPU) connected to said bus, said method comprising the steps of:
   (A) operating said CPU for entering into a primary scan mode for scanning said scan flag registers for detecting changes of state of given ones of said channels, respectively;
   (B) providing a state action table with a plurality of reference commands stored therein;
   (C) operating said CPU for checking in a secondary scan mode the validity of any of said detected changes of state of said channels;
   (D) changing via said CPU the stored states in said channel attribute structure for validated channel state changes;
   (E) comparing via said CPU the validated changed present state of one of said channels with the previous state of said channel, for accessing a reference command indicative of the action to be taken in view of a detected change of state of said channel;
   (F) providing a state processing table with a list of addresses of associated software routines necessary to carry out particular actions associated with given changes of state of said channels, respectively;
   (G) storing said software routines in said CPU;
   (H) applying via said CPU an individual one of said reference commands to said state processing table for calling up an associated said software routine, and for executing the routine for a particular channel;
   (I) generating within said CPU a feedback command for further processing, if necessary;
   (J) entering said feedback command into an output queue;
   (K) repeating steps (D), (G), and (H) for all channels that have changed state;
   (L) removing in an iterative manner, in an output phase scan mode, an individual one of said feedback commands from said output queue;
   (M) comparing in a valid command table the feedback command for a given channel with the present state of said channel as stored in said channel attribute structure, for validating said command;
   (N) generating via said CPU, for a validated command, a data signal from said valid command table to said channel attribute structure for obtaining correct channel identification for forming a proper command;
   (O) outputting from said CPU said command via an output packet to an associated logic card; and
   (P) repeating steps (M) through (P) in an iterative manner for all channels.

9. In a state driven system establishing an interface between an external entity and a plurality of peripheral devices all connected to a common bus, the method comprising the steps of:
   executing, via a central processing unit (CPU) connected to said bus, a primary scan phase for reading scan flag registers associated with a plurality of state messaging logic cards connecting said peripheral devices to said bus;
   processing via said CPU the data read from said scan flag registers for determining which ones of said peripheral devices have changed state relative to a prior scan phase cycle;
   executing via said CPU a secondary scan phase for determining the validity of state changes detected for given ones of said plurality of peripheral devices;

resetting via said CPU the ones of said peripheral devices determined to be associated with an invalid state change to insure a valid state change compatible with said external entity;

operating said CPU for indexing into a state action table for determining the action to be taken for operating in their new states the ones of said peripheral devices determined to have valid state changes;

operating said CPU for indexing into a state processing table containing programming commands, for responding to actions from said state action table for assembling the appropriate ones of the programming commands necessary for obtaining operation of those ones of said peripheral devices having changed states;

operating said CPU for executing an output scan phase for checking the validity of said programming commands relative to the new states of the given ones of said peripheral devices having changed states;

operating said CPU for responding to the commands for obtaining from memory and executing required program routines; and transmitting other ones of said programming commands from said CPU to said state messaging cards, for operating logic thereon as required for the new states of associated ones of said peripheral devices, respectively.

10. A computerized system for controlling the interconnection of a plurality of peripheral devices, said system, comprising:

a system bus;

a central processing unit (CPU) connected to said bus;

state messaging logic card means for connecting said peripheral devices to said bus, each including a scan flag register; and a state messaging scanner including:

software table means for storing programs necessary in different combinations for carrying out various functions, respectively, for interconnecting said peripheral devices;

primary scanning means for reading said scan flag registers of said state messaging logic cards, respectively, to determine whether said peripheral devices have changed state relative to an immediately preceding primary scan cycle; and secondary scanning means including means for validating any peripheral device state changes, and means for extracting from said software table means program commands for operating said state messaging logic card means to accommodate the validated changed states of said plurality of peripheral devices.

11. The system of claim 10, wherein said scanning means further includes means for checking the validity of a command extracted from said software table means relative to the new state of the associated peripheral device.

12. The system of claim 10, wherein said secondary scanning means further includes means responsive to detected invalid changes of state of given ones of said plurality of peripheral devices, respectively, for resetting to compatible states said CPU and said given ones of said plurality of peripheral devices.

* * * * *